(12) United States Patent
Rao et al.

(10) Patent No.: US 8,862,901 B2
(45) Date of Patent: Oct. 14, 2014

(54) MEMORY SUBSYSTEM AND METHOD THEREFOR

(75) Inventors: G. R. Mohan Rao, Richardson, TX (US); F. Michael Schuette, Colorado Springs, CO (US)

(73) Assignee: DataSecure LLC, Le Claire, IA (US)

(*) Notice: Subject to any disclaimer, the term of this patent is extended or adjusted under 35 U.S.C. 154(b) by 30 days.

(21) Appl. No.: 13/287,476

(22) Filed: Nov. 2, 2011

(65) Prior Publication Data

US 2012/0047373 A1  Feb. 23, 2012

Related U.S. Application Data

(62) Division of application No. 11/663,205, filed as application No. PCT/US2004/025578 on Aug. 6, 2004, now Pat. No. 8,060,756.

(60) Provisional application No. 60/493,287, filed on Aug. 7, 2003.

(51) Int. Cl.
  *G06F 11/30* (2006.01)
  *G06F 21/72* (2013.01)
  *G06F 12/14* (2006.01)

(52) U.S. Cl.
  CPC ............ *G06F 21/72* (2013.01); *G06F 12/1408* (2013.01)
  USPC ............................................. 713/190; 726/29

(58) Field of Classification Search
  CPC ..... G06F 12/14; G06F 21/72; G06F 12/1408; G06F 21/123; G06F 21/125; G11C 13/0059
  USPC .......... 380/257, 268, 264; 713/193, 189–190; 711/163–164; 714/178
  See application file for complete search history.

(56) References Cited

U.S. PATENT DOCUMENTS

| | | | | |
|---|---|---|---|---|
| 4,896,301 A | * | 1/1990 | Ogawa ...................... | 365/230.03 |
| 5,144,660 A | * | 9/1992 | Rose .............................. | 726/24 |
| 5,943,283 A | * | 8/1999 | Wong et al. .............. | 365/230.01 |

(Continued)

FOREIGN PATENT DOCUMENTS

EP          856818 A2 *   8/1998   ................ G07F 7/10

OTHER PUBLICATIONS

Niels Provos, Encrypting Virtual Memory, Center for information Technology Integration, University of Michigan, 9th USENIX Security Symposium Paper 2000, pp. 35-44 of the proceedings.*

*Primary Examiner* — Eleni Shiferaw
*Assistant Examiner* — Jing Sims
(74) *Attorney, Agent, or Firm* — Hartman Global IP Law; Gary M. Hartman; Michael D. Winter

(57) ABSTRACT

A memory subsystem and method for loading and storing data at memory addresses of the subsystem. The memory subsystem is functionally connected to a processor and has a first mode of address encryption to convert logical memory addresses generated by the processor into physical memory addresses at which the data are stored in the memory subsystem. The memory subsystem is adapted to pull low a write enable signal to store data in the memory subsystem and to pull high the write enable signal to load data in the memory subsystem, wherein if pulled high the write enable signal alters the address encryption from the first mode to a second mode. The memory subsystem is adapted to be coupled to a local hardware device which supplies a key that acts upon the address encryption of the memory subsystem.

3 Claims, 7 Drawing Sheets

(56) References Cited

U.S. PATENT DOCUMENTS

| | | |
|---|---|---|
| 6,173,358 B1* | 1/2001 | Combs .......................... 711/100 |
| 6,897,679 B2* | 5/2005 | Cliff et al. ...................... 326/41 |
| 2002/0099920 A1* | 7/2002 | Shoji ............................ 711/170 |
| 2003/0043636 A1* | 3/2003 | Zitlaw et al. ............. 365/185.33 |
| 2003/0133574 A1* | 7/2003 | Caronni et al. ............... 380/277 |
| 2003/0140206 A1* | 7/2003 | Yoneda et al. ................ 711/163 |
| 2004/0093505 A1* | 5/2004 | Hatakeyama et al. ........ 713/189 |
| 2012/0047373 A1* | 2/2012 | Rao et al. ...................... 713/190 |

* cited by examiner

MEMORY SUBSYSTEM AND METHOD THEREFOR

CROSS REFERENCE TO RELATED APPLICATIONS

This is a division patent application of U.S. patent application Ser. No. 11/663,205, filed Jun. 17, 2008, which claims priority based upon U.S. Provisional Patent Application Ser. No. 60/493,287 filed Aug. 7, 2003. The contents of these prior applications are incorporated herein by reference.

BACKGROUND OF THE INVENTION

The technical field of the invention is enhancement of security of "content" data in data storage, access, processing, and communication systems, in general. In particular, the invention addresses data security issues in the various subsystems of computers, networking system hardware, portable electronic systems, desktop electronic systems, and other semiconductor devices. An object of the invention is to increase by orders of magnitude the difficulty of successful intrusion from a network or by an unauthenticated user into such systems and devices for the purpose of stealing, copying or trashing data stored or undergoing processing therein.

Contemporary data processing and communication systems, as well as consumer systems, contain one or more CPUs (central processing units), main or system memory (volatile and nonvolatile), and various peripheral devices such as chip sets and hard disks for mass storage. The CPU is typically in one VLSI (very large-scale integrated circuit). The main or system memory, any dedicated memory such as graphics memory, the hard disks, and the controller circuitry associated with them comprise the memory subsystem. The ultrafast, relatively small cache memories (generally called L1, L2, possibly L3) built into the CPU are also usually considered part of the memory subsystem. Main or system memory typically consists of module(s) made up of DRAMs, SRAMs, and nonvolatile memory like flash. A module contains many such memory devices. Each of the DRAM (or SRAM, or flash) devices is organized into a number of subunits, called banks, blocks, sectors, subarrays etc. Each subunit contains a row×column matrix or matrices, with a storage cell or cells at each intersection of row and column. In order to access a bit, byte, several bytes, a word, a page, or other unit of data in the memory subsystem, an address (eventually decoded) consisting of a device address, bank address, row address, column address, and any other predetermined sequences of data (called bursts) must be provided. All memory subsystems operate through LOADs (or READs) from the memory subsystem, and STOREs (or WRITEs) to the memory subsystem by the CPU.

The controller devices and circuitry that interface between the CPU and the memory subsystem make up the system's memory management unit (MMU). The MMU, which may be in part physically integrated into the CPU and/or located in chip sets associated with the CPU, typically includes among other devices an Address Translation Table (ATT). The ATT receives and operates on all requests from the CPU for LOADs and STOREs to and from the memory subsystem. All units of data transmitted in this process contain the actual or content data, along with the address information indicating where, as viewed from the CPU, the content data is (for a LOAD) or will be (for a STORE) located in the physical memory. But, for more efficient manageability of data in available physical locations within the total memory space, those locations being in some degree non-contiguous, fragmented, or random, the addresses specified by the CPU (often called "logical" or "virtual" addresses) are translated or mapped by the ATT into the physical addresses. Such address translation or mapping causes the physical addresses to be presented to the operating system and CPU as contiguous, unfragmented and optimally structured addresses for best system performance. The ATT that performs this function could be in software, either as a part of the operating system, or as a part of a separate translation utility, or as a part of an application programming interface (API). The ATTs can also be implemented in hardware in the CPU, or an associated chip set, or a memory controller that interfaces the CPU with the MMU and the memory subsystem. Some CPUs have the memory controllers as a physically integral part of the CPU itself, though the controllers are functionally part of the MMU. Additionally, modern operating systems allow each program to create its own virtual protected memory space, for faster look-up of relevant addresses, which results in more efficient data access, consisting of LOADs and STOREs as noted. In this scheme, the address "tags" and/or "pointers" that correlate the logical address blocks with actual locations in physical memory are usually cached in Translation Look Aside Buffers (TLBs) which are an integral physical part of the CPU (or sometimes, its associated chip set) and also functionally comprise a component of the MMU.

For content data access to or from the memory subsystem, the physical addresses have to be decoded on the associated chip set level using the ATT and/or the cached address tags (pointers) from the TLBs. The chip sets typically have the MMU's memory controllers as an integral part—the memory controllers perform command, control, clock, address, and any other necessary service functions (e.g., DRAM refresh). In nonvolatile memory controllers (flash controllers), a refresh function is not necessary. However, "write verify" functions, or, "erase before program" functions and associated steps are executed by such a memory controller. If ferroelectric memories are the devices in a memory subsystem, the memory controller may have a different set of functions to be served. Physical addressing to the devices can be either multiplexed addressing or non-multiplexed addressing (divided in time domain, and, triggered by a system clock).

In current electronic machines, when the CPU needs access to the memory subsystem for the purpose of executing a READ or WRITE operation on data, it generates a logical address as described earlier. This logical address in turn is translated by the address translation table to an address in physical memory as described earlier and the pointers are stored in the TLBs. This is the dominant process used to convert logical addresses to physical addresses and to keep track of the entries. The memory controller may optimize the physical memory depending on available storage locations, and any other application-dependent requirements for contiguous memory. Let us consider a representative example of a DIMM (DRAM Dual-in-line Memory Module), Micron Technology Inc.'s MT36VDDF256722-GB DIMM. DRAM DIMMs are used as system memory in PCs and servers. This device has 134,217,728 ($=2^{27}$) addressable locations in physical memory. Thus the CPU/memory controller needs to control 27 total address bits (13 row and 12 column bits, plus 2 bank select bits). These 27 address bits are the same for any memory access, namely, READ or WRITE etc. Hence, if an intruder accesses data (performs a READ), subsequently manipulates/corrupts the data, and that altered data is written back to the same location in physical memory from which it was (first) accessed, data tampering or trashing occurs. No reasonable amount of data scrambling or encryption can mitigate the above event, nor can the correct data be recovered.

Alternatively, an intruder can employ a sequence of READs for the purpose of stealing random blocks of data rather than tampering with or trashing it. Because this type of transaction is extremely fast, large databases can be copied with the expectation that they will contain data (content, information) useful for the intruder.

Under the current art, for a malicious intrusion over a network such as the Internet, intranet, VPN, LAN (wired and wireless) or the like to succeed, the intruder need only gain access to the targeted computer or other device (server, workstation, hard disk, smart card) so as to be able to issue instructions to the device's memory subsystem. All content data including that targeted by the intruder must pass through the memory subsystem, for any access (LOAD or STORE, READ or WRITE). Access could occur through the targeted machine's network connection which involves the CPU (or chip set, or a base station) or similar devices. DMA (Direct Memory Access) is also possible, bypassing the CPU (or similar functional device). In a machine with dedicated graphics memory, an intrusion could also occur through the graphics memory controller. In a smart card type portable system, the memory subsystem could comprise flash memory or ferroelectric memory or phase-change memory or plastic memory or molecular memory or carbon nanotube memory, or a combination of any of the above in a chip stack with either DRAM or SRAM. In conventional systems not employing the invention described herein, once the intruder has succeeded in breaching the external defense such as a firewall, the intruder will be able to retrieve data and issue new instructions to the memory subsystem.

With respect to firewalls in conventional current practice, "firewall" is a broadly used term including a variety of hardware and/or software arrangements that enforce a network owner's policies governing access to and from systems on a network. Suffice it to say, today's firewalls are data-centric and data-driven, in that they consist primarily of data encryption and decryption algorithms plus user authentication procedures. However, data encryption and decryption dramatically increases memory overhead, and slows down system performance, in addition to hogging precious bandwidth. Even if layers of data encryption (or data scrambling) are employed, decryption technology keeps pace with it very quickly. Log-in names, passwords, and similar or more sophisticated user authentication procedures for logins are some of the mechanisms used in the industry today for verifying access permissions. In addition, inside-the-firewall defensive measures are widely used. These include frequent updating of virus detection and elimination software to combat malicious data theft, trashing, denial-of-service attacks, Trojan horses, worms, and the like. However, even with implementation of all these known measures, the electronics industry has not been able to prevent these attacks. Hence, a need has arisen to take content security to a new level, at minimal cost, without undue sacrifice of performance (e.g., increased latencies and reduced bandwidth).

BRIEF DESCRIPTION OF THE INVENTION

This invention addresses the problems of security in data storage, access, processing (and data manipulation/changes), and communication systems, in general. In particular, it addresses data security issues in the various subsystems of computers, networking system hardware, portable electronic systems, desktop electronic systems, and other semiconductor devices as well, by means of encryption of addresses in physical memory to which data is written and subsequent decryption of the physical memory addresses from which the data is read. The invention can be implemented through software, hardware, firmware or any combination thereof. Implementation in Digital Rights Management execution using the invention will reduce cost, enhance performance, and provide additional transactional security.

According to a first aspect of the invention, a memory subsystem is provided that is adapted to load and store data at memory addresses thereof. The memory subsystem is functionally connected to a processor and has a first mode of address encryption to convert logical memory addresses generated by the processor into physical memory addresses at which the data are stored in the memory subsystem. The memory subsystem is adapted to pull low a write enable signal to store data in the memory subsystem and to pull high the write enable signal to load data in the memory subsystem, wherein if pulled high the write enable signal alters the address encryption from the first mode to a second mode. The memory subsystem comprises means for coupling to a local hardware device adapted to supply a key that acts upon the address encryption of the memory subsystem. In a preferred embodiment, the key causes switching of the address encryption between the first and second modes as a function of the write enable signal being pulled low or high.

From the above, it should be apparent that the invention uses ADDRESS encryption (as opposed to data encryption) as an effective solution to content data security issues. Address encryption and decryption (address scrambling and descrambling, as some may call them) can be used independently of data encryption—combining both of them is expected to improve security by orders of magnitude. From the above, it should also be apparent that the invention includes several embodiments. In each of the embodiments, the memory subsystem itself, in effect, becomes a highly secure firewall. This is achieved by providing two separate address decryption and decryption operations, an encryption operation for executing WRITE instructions, on the one hand, and a decryption operation for executing READ instructions, on the other hand, independently of each other. Throughout this specification, "WRITE" includes WRITE, WRITE/MODIFY, WRITE BACK, and WRITE THROUGH operations, and also the segment of READ/MODIFY/WRITE operations wherein data is written to the memory subsystem; and "READ" includes READ operations, and also the segment of data READ/MODIFY/WRITE operations wherein data is retrieved from the memory subsystem. The algorithm or "key" used for address encryption is not made directly available or accessible for the address decryption attending READ operations. Rather, the decryption algorithm or key, which must complement the encryption algorithm or key so as to exactly reverse the address encryption, is generated at the same time as the encryption algorithm or key, but in separate circuitry that is not accessible by, and cannot be activated by, an intruder over a network or an unauthenticated would-be local user. Thus, any attempt to extract data from, or take control of, the system from a network or by an unauthenticated local user will be unable to obtain coherent output from the memory subsystem and the attempt will fail.

The principles of this invention apply not only to a CPU-centric system like a PC or cell phone or PDA or server or smart card, but also to systems with DMA controllers and memory, hard disk controllers and memory, graphics controllers and memory and the like. Furthermore, the word CPU is used broadly—its associated logic chip set and memory controller can be an integral part of it or external to it. A CPU in this invention moreover also refers and includes DSPs (Digital Signal Processors), embedded microcontrollers, and similar processors.

Other aspects and advantages of this invention will be better appreciated from the following detailed description.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION OF THE INVENTION

Figure 1:
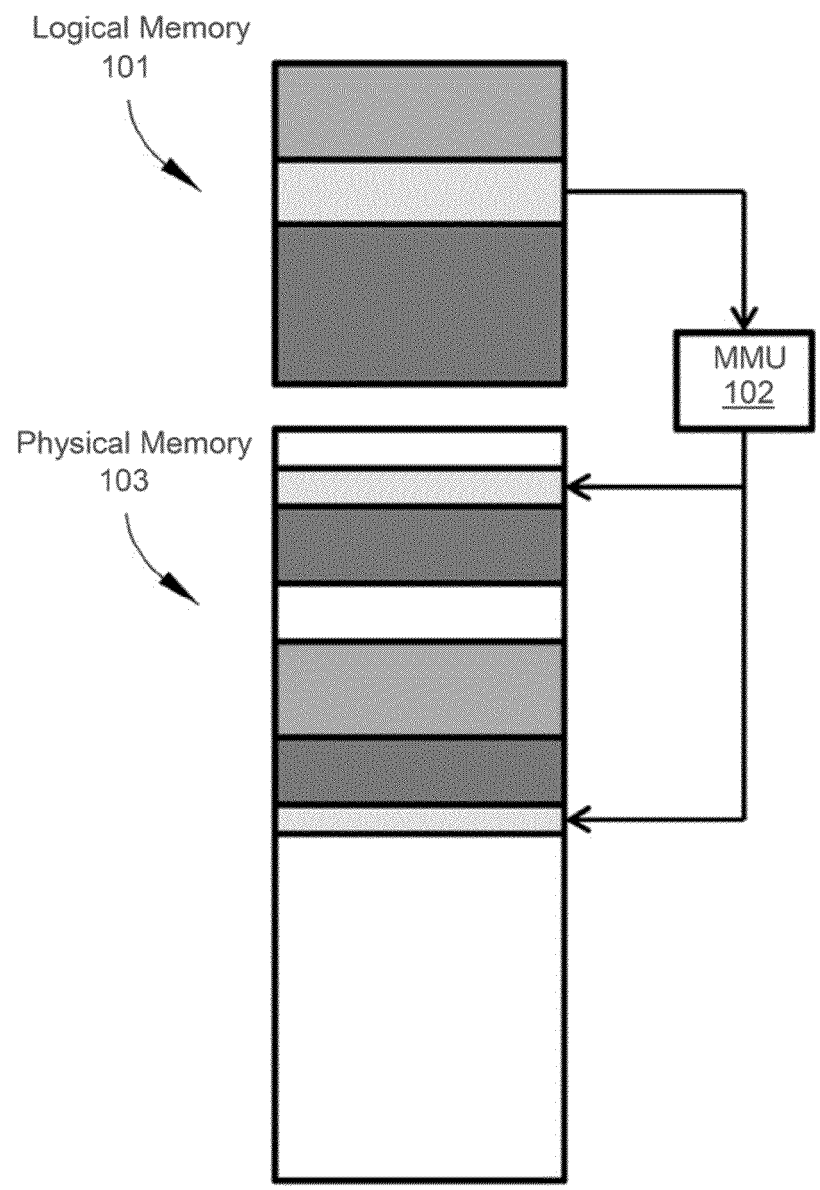
FIG. 1 is a diagram and flow chart of the relevant operations of a computer (or similar device) as used in the conventional architecture of today, illustrating the translations between logical addresses 101 and physical addresses 103 that occur in a typical system. A single address translation table is used for both READs and WRITEs.

The following describes embodiments of the invention that are capable of making intrusions extremely difficult, for example, orders of magnitude more difficult than in current systems. In one preferred embodiment, a bit offset is applied to a logical address generated by the MMU 102, for the first LOAD in a sequence of accesses. Specifically, this might comprise further modifying the physical address determined by the MMU 102, during the WRITE operation. Such bit offset can be accomplished in many ways—by adding or subtracting a fixed or sequenced binary value to the (in the present example) 25 bits (out of the total of 27 bits) that comprise the physical memory row and column addresses. It is preferable to not change the bank address bits—although it is not forbidden—because in a DRAM, bank jumps can cause latency penalties. While in some memories like SRAMs such is not the case, in a flash memory one may have to pay an even longer latency penalty by switching to a different memory subunit. This offset value is the key that encrypts the addresses in physical memory in LOAD operations. It is not necessary for a CPU, DSP, embedded microcontroller, DMA controller, hard disk controller, or graphics controller to know of the existence of this additional encryption step; indeed it is essential that they not have this knowledge. In other words, the system's devices that are external to system memory are agnostic to the fact that the content data have been written to physical addresses different from those shown in or generated in the address translation table and/or the TLB tags. As a consequence, if a READ request is thereafter issued for access to the original, pre-offset, memory location, the READ will be from a physical memory location that contains different data than intended, namely data that is one or more of non-existent, incorrect, irrelevant, or incoherent 109. If a READ request 108 is transmitted to the MMU 102 by an intruder over a network or by an unauthenticated local user, such will be the case. This can be done in a number of ways, from a simple access code (including, for example, a pre-defined time valid window for access or more sophisticated methods including biometrics such as finger prints, voice verification or retinal scans). Since the returned data 109 is either non-existent, incorrect, irrelevant and/or incoherent, a checksum error 110 will be generated (checksum error implementation is well known in the industry) and the operation will stop. The checksum error 110 can be used to generate an intrusion alarm and trigger further protective measures, like a system lockout or even power shutdown. In the case of intrusion through a DMA controller, hard disk controller, graphics controller etc., the above also applies because those devices and their associated circuitry for accessing their respective physical memories are agnostic to the WRITE encryption key in the same manner as the CPU.

In the embodiment above, the encryption key is very simple, namely an offset value or a sequence of offset values to the address bits. Other embodiments are possible as well in hardware, firmware, or software. Address inversion is one such embodiment. Address table look-up for cross mapping, left shift, right shift, barrel shift, address fragmentation—all of these individually, or as a combination thereof, can provide still better enhancement to data security, as compared to that afforded and obtained in current systems. All these techniques can be implemented with minimal cost and performance penalty and are well known in the art.

There are likewise various devices and techniques that can be used to make the decryption algorithm or key 106 available during a READ operation, in order to reverse the encryption of the physical memory address generated in the prior WRITE operation. The simplest means to do so, is to require legitimate local users to enter the offset value before using the local machine (or smart card or similar portable appliances). Expressed as a decimal number, the offset can be as small as a single digit. However, to prevent inadvertent or deliberate leaks of the number, as can easily happen with passwords, a more secure means is to use a simple local hardware device to communicate the decryption key 106 to the local machine, or machines if connected in a network. That particular device, though transparent to the user, will be activated only by some action 106 on the part of the legitimate user that is not replicable by a network intruder. For example, the user's log-in information entered at the local keyboard (and no other keyboard) can, in addition to its normal function, pass a command through an independent circuit on the local machine that is not accessible from any outside network and further is not accessible locally except by proper log-on by a duly authenticated user. This command triggers the release of the decryption algorithm or key 106, and can also perform related useful functions such as maintaining a log of accesses and use.

If so desired, the invention's embodiments can create new security firewalls at every stage in an electronic system where there is physical memory. As an example, in today's conventional PCs with one CPU, one can create such enhanced security firewalls one each at system memory, at graphics memory on the motherboard or add-in graphics card, at the hard disks, and so forth. In a more complex, multi-CPU processor, these inventions can be implemented at many places where such physical memory exists. In a DRM scenario, where multiple transactions may be in multiple databases, whether those data base segmentations are done in software or in hardware such as physical memory, the invention's implementation offers enhanced security. The embodiments described here can be incorporated in monolithic integrated circuits, SIP (System-In-Package), SOC (System-On-Chip), SIC (System-In-Chip), electronic cards, electronic subsystems including modules, or original equipment systems. In an enterprise environment, the invention's embodiments can be implemented in one device, many devices, one database or several databases.

FIG. 1 illustrates a conventional architecture in which there is no encryption of physical memory addresses. Data encryption is allowed, though not shown. As the arrows indicate, the single address translation table of the MMU 102 translates back and forth between logical (virtual) addresses 101 and physical memory addresses 103. Content data which is the subject of a WRITE to a given logical address in 101 can always be retrieved from the memory subsystem by specifying the identical logical address in 101 in a subsequent READ instruction. In a system not protected by the present invention, an unauthorized, malicious intruder can thereupon extract the data, alter it, trash it, and then write back to the same location in physical memory, following which the data is useless and in fact probably causes irreparable damage to a transaction.

Figure 2:
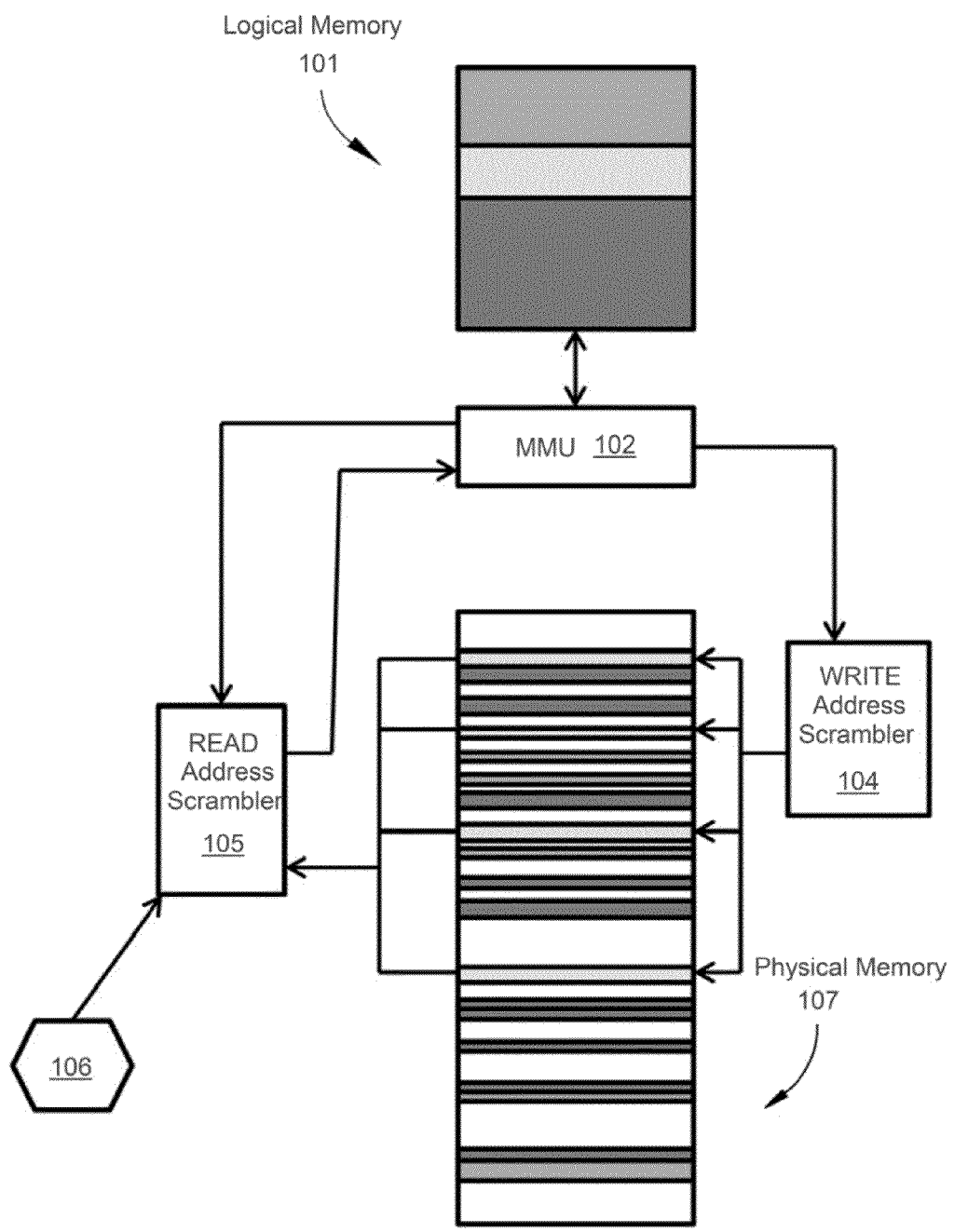
FIG. 2 depicts the operations of the invention in which address encryption and decryption are implemented in authorized use, and is a preferred practical embodiment of the invention.

FIG. 2 illustrates a preferred practical embodiment of the process of physical memory address encryption and subsequent decryption. The WRITE Address Scrambler 104 of the diagram encrypts the physical memory addresses in 107 to which the data is routed, using an encryption algorithm or key. Such an encryption algorithm or key can, in this and other embodiments, be preferably supplied from a small segregated area of nonvolatile memory in the system, such nonvolatile memory not being accessible from an outside network. These locations in physical memory are not known to the CPU or MMU 102, as described earlier. Conversely, the data located at the physical memory addresses which the CPU and MMU 102 "believe" to be correct proper, is in fact non-existent, unresponsive, incoherent or incorrect as a response to the CPU or MMU's READ requests, again as described earlier. However, if the READ Address Descrambler 105 of the diagram is triggered as described above by furnishing the decryption algorithm or key 106, the correct addresses in physical memory will be executed, and the resulting data set will be coherent culminating in a successful READ operation.

The prior art refers to an address scrambling method wherein logical addresses are scrambled or "mapped" to physical addresses during the execution of a particular WRITE instruction, and the physical addresses are thereupon transmitted to the memory subsystem over the system's address bus. However, under that prior art and unlike the present invention, it appears that the physical address remapping or scrambling process is automatically reversed when a READ command is presented to the memory subsystem. There is no requirement of furnishing a decryption algorithm or key 106 the availability of which can only be triggered by a duly authenticated user and not by an intruder. In consequence, only limited or possibly no enhancement of the security of the data held in the memory subsystem is achieved.

Figure 3:
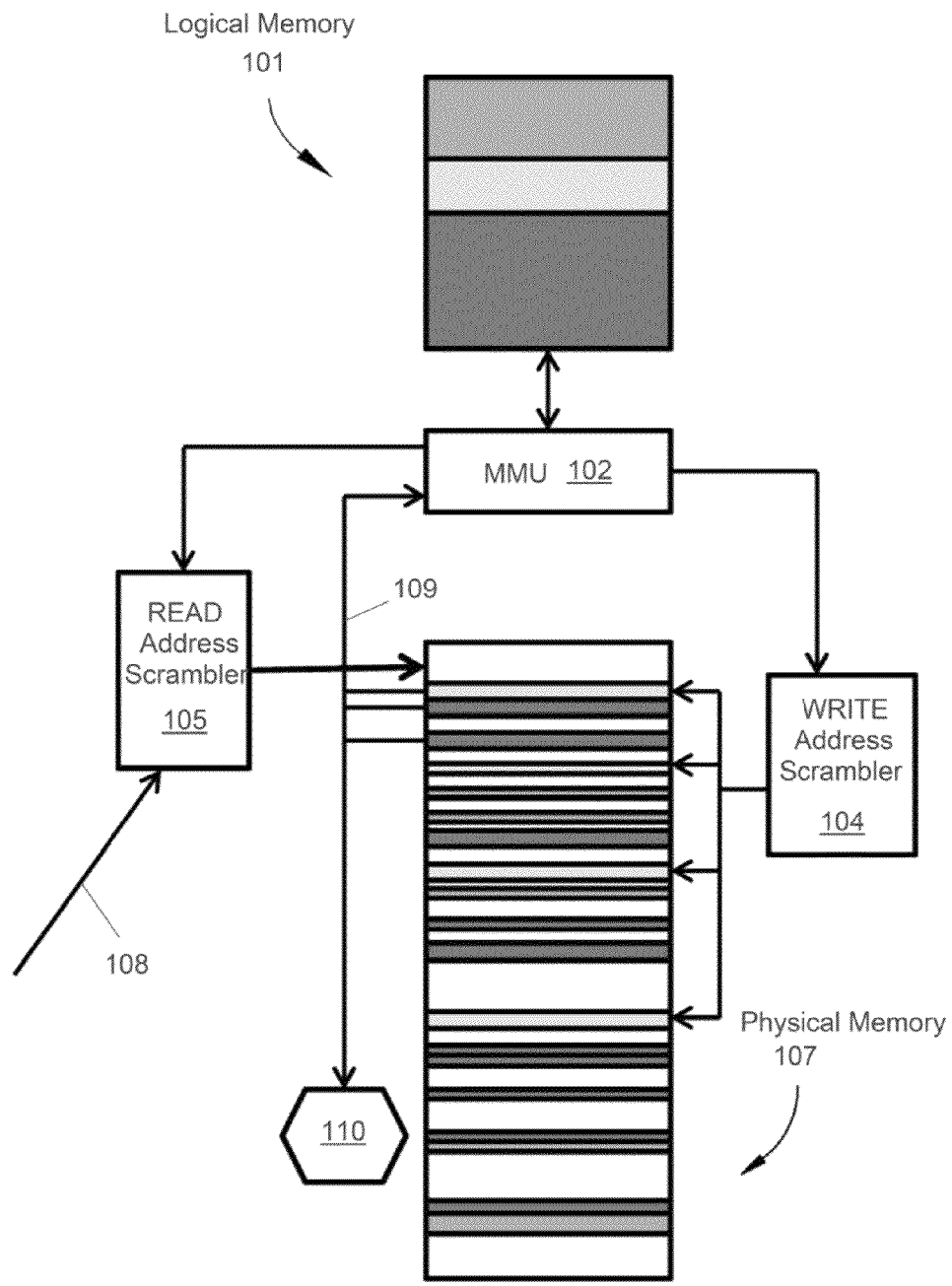
FIG. 3 depicts the operations of the invention in a case in which protection is implemented against unauthorized use.

FIG. 3 illustrates the sequence of events if the decryption key is not furnished 108 because access to the local machine or device is by unauthorized access over a network (or without a network in a stand-alone system). In this case the WRITE process is the same as in the preceding case—the data is dispersed by the address encryption to locations in physical memory unknown to the CPU, MMU 102 or other subsystem. Because the decryption does not occur correctly, the data to be retrieved by the CPU and/or MMU 102 in a subsequent READ operation is sought from an incorrect location, resulting in retrieval of invalid or useless data 109. This will trigger a checksum error 110 as described earlier.

Figure 4:
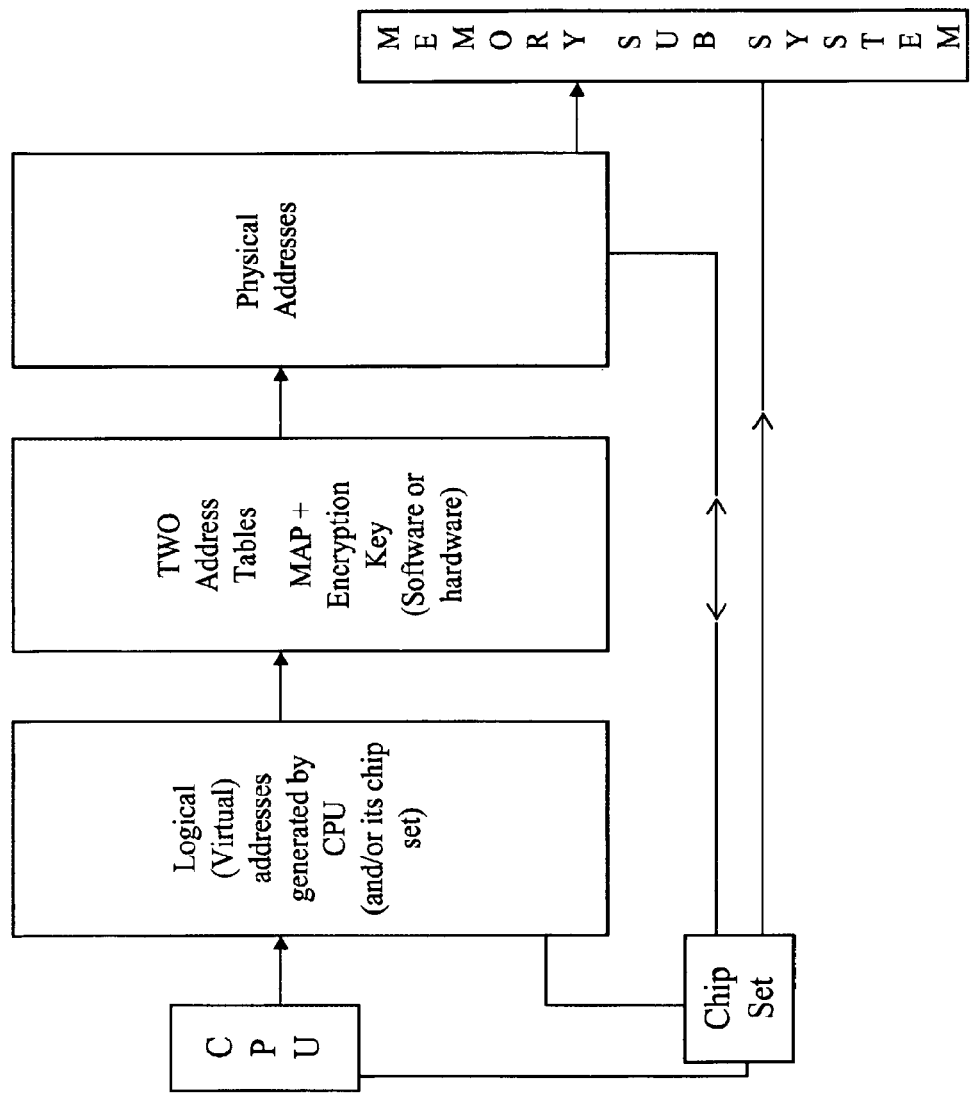
FIG. 4 is a block diagram of an embodiment of the invention using two distinct address tables, one for mapping of logical (virtual) addresses to physical memory addresses and encryption of the physical memory address in WRITE operations, and the other such table for decryption of the physical memory addresses in the READ operation.

FIG. 4 shows an embodiment where the CPU or the MMU generates an address for access to memory subsystem contents, which, here and elsewhere, can include the contents of L2 or possibly L3 cache memory or a hard disk as well as the DRAM main memory, and could also include dedicated graphics memory in a system with a separate graphics controller. Generated at the same time are the appropriate command, address, clock, and controller signals for memory content access. The encryption of the physical memory addresses to which data is sent after a WRITE operation is combined in a single table together with the conventional mapping of logical addresses to physical addresses. The key used for this encryption is supplied from a secure location as stated with respect to FIG. 2. Unlike the prior art, a separate, second table is used for decryption of physical memory addresses when a READ is performed. The decryption key for use by this table is furnished by the user or local machine as described previously. As in the prior and subsequent embodiments, unless the encryption keys in the two tables correspond exactly, data returned by the READ operation will be invalid and trigger a checksum error as described above. With respect to physical placement, the tables can be effectively implemented on the die of the CPU or its associated chipset without significant consumption of additional die real estate, or can be implemented separately as a field programmable gate array (FPGA) or programmable logic device (PLD), both well known to system designers versed in the art.

Figure 5:
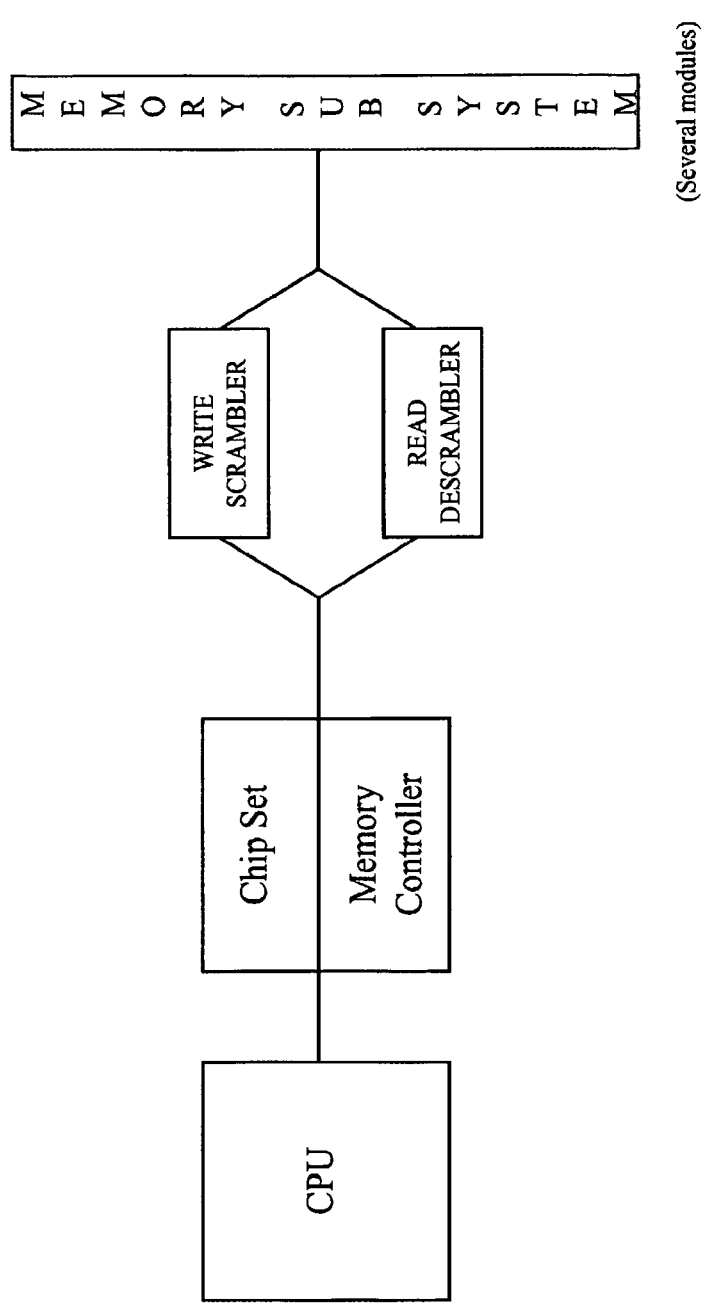
FIG. 5 is a block diagram illustrating another embodiment of the invention in which the encryption and decryption (scrambler and descrambler) system is inserted between the memory controller and DRAM memory (it should be understood here and elsewhere in this invention that an identical mechanism, or a modified mechanism, is implementable between a DMA controller and system memory, between the hard disk controller and the memory subsystem, between the graphics controller and graphics memory, and, between the flash smart card controller and its flash memory).

In the embodiment of FIG. 5, the scrambler/descrambler encryption system is inserted between the memory controller and DRAM memory. It will be understood that an identical concept can be implemented between the DMA controller and the memory subsystem, the hard disk controller and the hard disk(s), and between a graphics controller and dedicated graphics memory, if present. If so desired, both the address scrambler and descrambler can be made programmable on the fly so as to generate new encryption keys at programmed intervals or ad hoc. Switching between the two units for read and write operations is a function of the write enable (WE) signal pulled LOW (for the write data path) or HIGH (for the read data path). All the other clock/command/control signals as well as the addresses before the scrambler/descrambler pair and after the scrambler/descrambler pair are reunited to continue to the memory subsystem.

Figure 6:
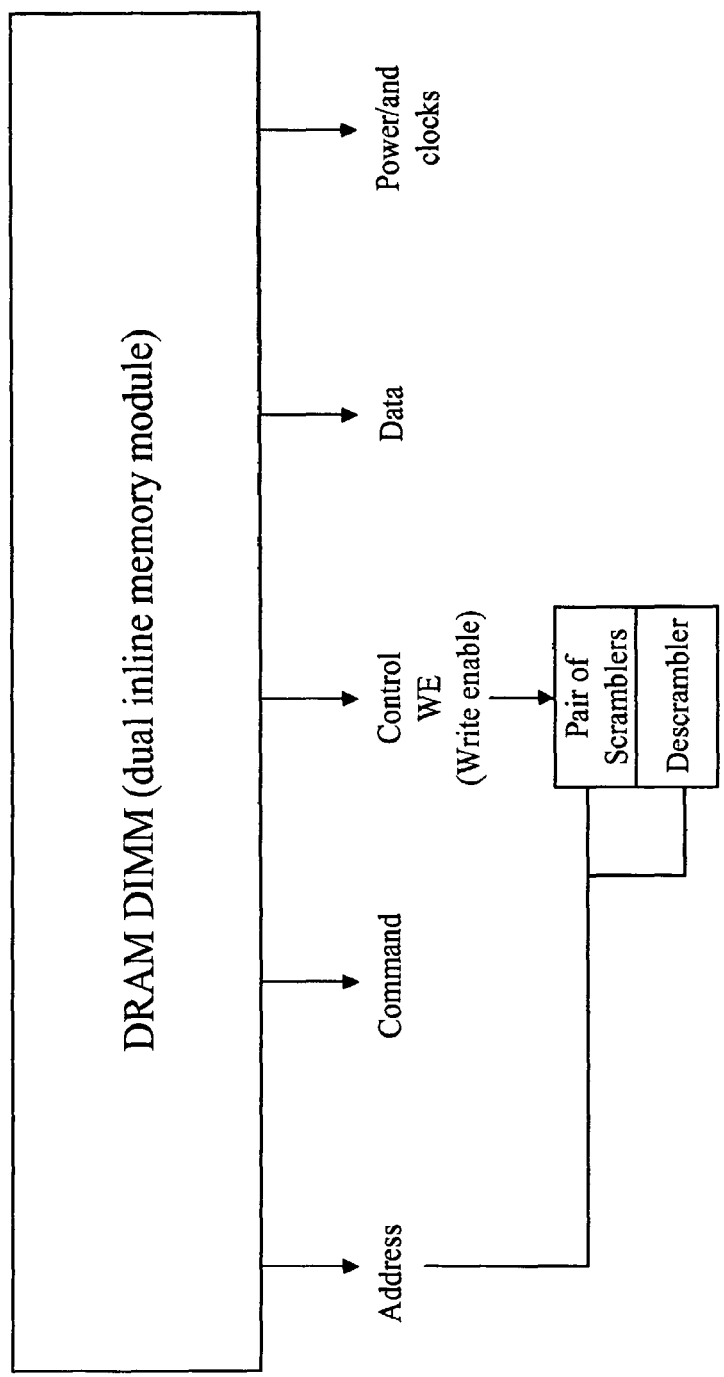
FIG. 6 illustrates yet another embodiment of the invention where the invention is implemented in the DIMM itself. The DIMM can be DRAMs, SRAMs, flash devices, ferroelectric memories, phase change memory devices, calcogenide memory devices, organic memory devices, plastic memory devices, carbon nanotube memory devices, magnetic RAM devices, and any combination thereof.

In the embodiment of FIG. 6, there is shown a scrambler/descrambler pair for address scrambling on each memory module (DIMM) itself. This will further enhance security, because large applications may need data from several modules, each of which will scramble and descramble addresses using different algorithms keys.

Figure 7:
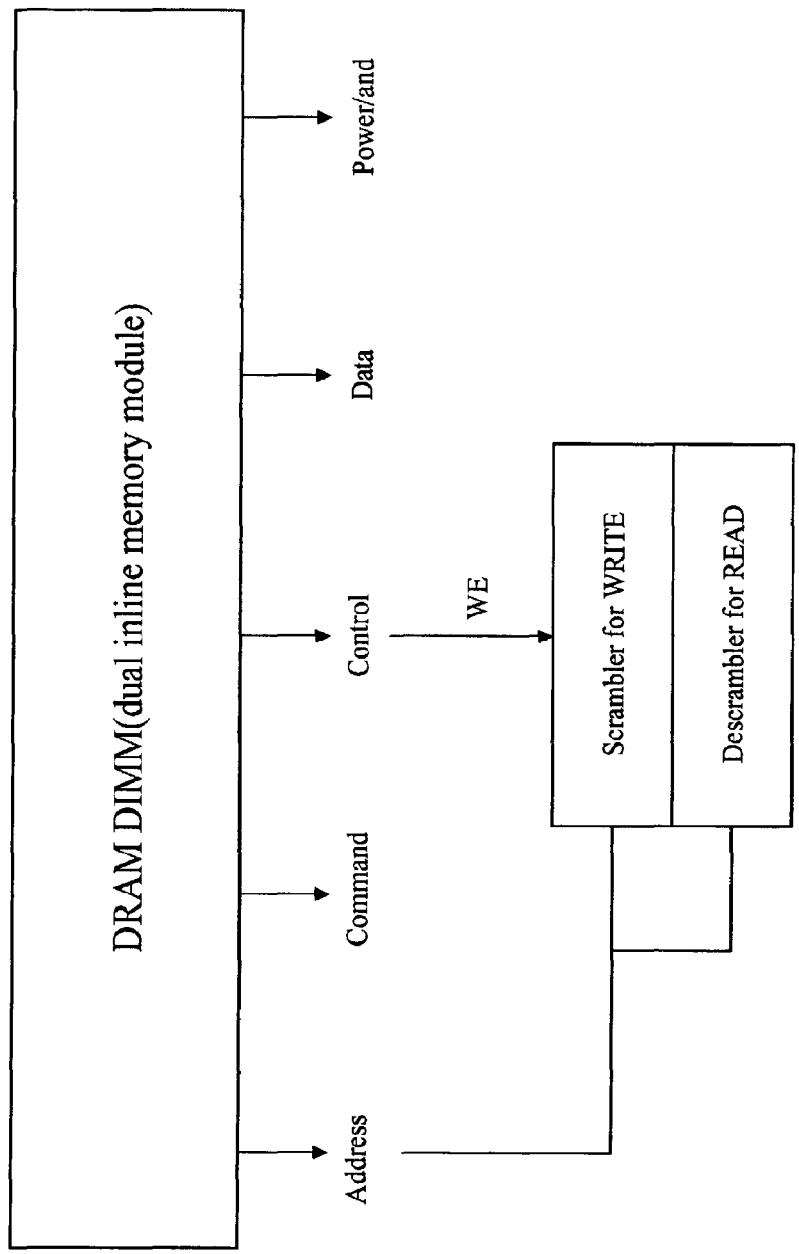
FIG. 7 illustrates yet another embodiment of the invention in which the bank addresses for each device are scrambled at the DIMM level, in addition to scrambling of the row and column addresses.

FIG. 7 illustrates yet another embodiment, where the bank addresses for each device are also scrambled at the DIMM module level, in addition to the scrambling of the row and column addresses. This enhances security further.

Further extensions of the invention are possible for the embodiments illustrated in FIGS. 6 and 7. The scrambler/descrambler pairs can further encompass different encryptions within the same system for additional data security, by encrypting at each module in an owner-specified manner. An additional extension will encompass the use of fault-tolerant mechanisms such as are employed in hot-swappable memory subsystems and which are well known in the art. This entails temporarily purging data from the memory subsystem, changing the encryption keys on the fly and then restoring all data to the modules using the new encryption keys. This can further reduce or eliminate the down time for maintenance that would otherwise be necessary for conventional (routine) changing of the encryption keys. Chip kill techniques (also well known in the art) can also be included with the encryption.

As noted previously, the address scrambler/descrambler pair can also be implemented in software. It can further be implemented as hardware as a pair of FPGAs or PLDs, or cross bar switcher or the like. Because changing encryption keys will trash the data currently residing in the memory subsystem, the data needs to be offloaded to other devices, or preferably written back to nonvolatile storage during routine storage maintenance (as opposed to hot swaps). Security can be increased further by embedding a system signature for cyclic redundancy check of the reference code, a mismatch of which will trigger an immediate alarm. Unauthorized access through code cracking can be warded off by a simple switching of the encryption key to an alternate value to render the entire data unrecognizable even if the correct key is subsequently supplied. This method makes it impossible to employ scanning of keys into the system until the valid key is supplied, since with every new access another key will be used and therefore the statistical probability for a match is reset. However, accidental lock-out is avoided since there is a finite number of alternate keys that are randomly rotated, and if the correct key is supplied by a supervisor, it is a matter of finite accesses until the correct key will hit the corresponding encryption data. Note that this can only occur with the correct key; even if by chance an alternate key is met, the addresses will still be invalid and return no data.

For an enterprise, these inventions can be applied at every place where there is physical memory or a database. Although the present invention has been described in some detail, it should be understood that various changes, substitutions, and alterations can be made thereto without departing from the spirit and scope of the invention as defined by the appended claims. Thus, there have been described and illustrated herein various methods suitable for use in conjunction with the design and manufacture of a broad range of electronic systems and devices. However, those skilled in the art should recognize that numerous modifications and variations may be made in the techniques disclosed herein without departing substantially from the spirit and scope thereof, which is defined solely by the claims appended hereto.

As is well known, cyber crime has evolved as a significant problem in a commercial world dominated by e-commerce. Flow of data, primarily digital, from multiple sources to multiple destinations through difficult-to-monitor communication and storage networks offers new challenges for protection of data. Security breaches to data, accessed through hacking, worms, viruses, identity theft, and rogue employees, have become increasingly common.

Thus, security of digital content data is vital, whether such data is in storage or in transit or in modification for some destination. Encryption and decryption of data has been implemented for many decades. As vulnerability of content data increases, a need has arisen to secure the content from the enterprise level (e.g., a server farm) through the device level (example is a smart card). Content can be valuable financial data, customer records, trade secrets, and intellectual property. Technologies deployed for such content protection in business communications today are vulnerable to content theft, manipulation, and misappropriation. E-mail, wireless LANs, instant messaging, PDAs, smart cards, floppy disks, CDs are all vulnerable. Traditional techniques of data scrambling and rudimentary "key" execution (password, in most cases) are inadequate for the level of content protection demanded today. In business enterprises and elsewhere, firewalls can protect against external attacks. VPNs (Virtual Private Networks) can conduct data safely between the server and the workstation. However, neither of these systems can protect data once it is resident in the desktop or any other client device (a memory module, an integrated circuit, a solid state storage device). Another challenge that has emerged recently is Enterprise DRM (Digital Rights Management). Unlike other security mechanisms that protect data at rest or in transit, enterprise DRM is required to protect data while it is "live" in an application, on a desktop, or as it is being used.

The invention described herein offers substantial mitigation of the above problems, at reasonable cost in terms of die space, required new engineering, and demands on system performance and bandwidth.

While the invention has been described in terms of specific embodiments, it should be apparent that other forms could be adopted by one skilled in the art. Therefore, the scope of the invention is to be limited only by the following claims.

The invention claimed is:

1. A memory subsystem adapted to load and store data at memory addresses thereof, the memory subsystem being functionally connected to a processor, the memory subsystem being adapted to pull low a write enable signal to store data in the memory subsystem and to pull high the write enable signal to load data in the memory subsystem, the memory subsystem comprising:

an address encryption system having first and second address scramblers, the first and second address scramblers configured to convert logical memory addresses generated by the processor into physical memory addresses at which the data are stored in the memory subsystem, the first and second address scramblers being configured to convert logical memory addresses into physical memory addresses according to different algorithms, wherein the address encryption system converts logical memory addresses into physical memory addresses with the first address scrambler in the event of a WRITE operation, wherein if the write enable signal is pulled high in the event of a READ operation the address encryption system converts logical memory address into physical memory address with the second address scrambler; and a local hardware device supplying a key to the memory subsystem, wherein in the event of a READ operation supplying of the key causes the address encryption system to switch from the second address scrambler to the first address scrambler and convert the logical memory addresses into physical memory addresses with the first address scrambler instead of the second address scrambler, wherein if the key is not supplied, the data retrieved by the processor in a READ operation is sought from incorrect physical memory addresses according to the algorithm of the second address scrambler resulting in retrieval of invalid or useless data.

2. A method of operating a memory subsystem adapted to load and store data at memory addresses thereof, the memory subsystem being adapted to pull low a write enable signal to store data in the memory subsystem and to pull high the write enable signal to load data in the memory subsystem, the method comprising:

functionally connect the memory subsystem to a processor;

coupling the memory subsystem to a local hardware device adapted to supply a key to the memory subsystem in the event of a READ operation;

operating the memory subsystem to have an address encryption system having first and second address scramblers configured to convert logical memory addresses generated by the processor into physical memory addresses at which the data are stored in the memory subsystem, the first and second address scramblers being configured to convert logical memory addresses into physical memory addresses according to different algorithms, converting logical memory addresses into physical memory addresses with the first address scrambler in the event of a WRITE operation, converting logical memory addresses into physical memory addresses with the second address scrambler if the write enable signal is pulled high in the event of a READ operation; and switching from the second address scrambler to the first address scrambler and converting the logical memory addresses into physical memory addresses with the first address scrambler instead of the second address scrambler if the local hardware device supplies the key to the memory subsystem;

wherein if the key is not supplied, the data retrieved by the processor in the READ operation is sought from incorrect physical memory addresses according to the algorithm of the second address scrambler resulting in retrieval of invalid or useless data.

3. The method of claim 2, wherein if the key is not supplied, the data retrieved by the READ operation will be invalid or useless and a checksum error will be triggered.

* * * * *